Dec. 24, 1957 W. T. CORSETTE 2,817,543
SWIVEL CONNECTION HAVING SPLIT BEARING RING
AND MEANS FOR RETAINING THE SAME
Filed April 16, 1954
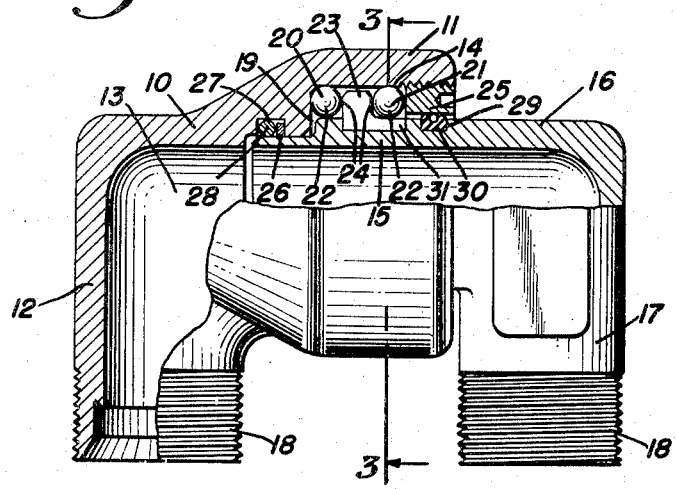
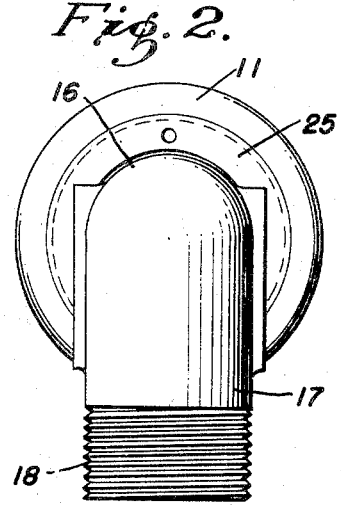
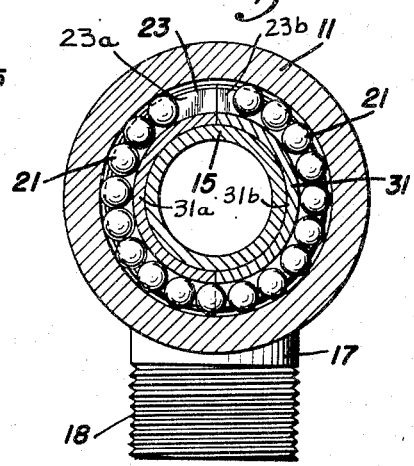
William T. Corsette
INVENTOR.
BY
Attorney United States Patent Office 2,817,543
Patented Dec. 24, 1957

2,817,543

SWIVEL CONNECTION HAVING SPLIT BEARING RING AND MEANS FOR RETAINING THE SAME

William T. Corsette, Long Beach, Calif., assignor, by mesne assignments, to The Youngstown Sheet and Tube Company Application April 16, 1954, Serial No. 423,809

2 Claims. (Cl. 285—281)

My invention relates in general to swivel connections, and relates in particular to a swivel connection for connecting pipe members so that they may swing in parallel planes around an axis which is perpendicular to the parallel planes.

It is an object of the invention to provide a swivel connection consisting of two integrally formed angle fittings and simple bearing structure for connecting the cylindrical parts of the angle fittings together.

A further object of the invention is to provide a swivel connection having bearing means of simple form which will enable the connection together of the two angle fittings or tubular parts of the swivel connection, this bearing means consisting of two rows of bearing balls separated by a ring or flange which projects outwardly from the inner tubular part of the swivel within the outer swivel part, this ring being characterized by being split so that it may be mounted upon the inner tubular part as a separate piece, there being a simple means for holding the split ring in place on the inner tubular part of the swivel comprising cylindrical shelf beams extending from the split ring in a position to lie radially within and so as to be engaged by the balls of one of the rows of ball bearings, radially outward movement of the component parts of the split ring being thereby prevented.

Further objects and advantages of the invention may be brought out in the following part of the specification wherein the description of details of the invention is intended for purpose of disclosure without intending to limit the scope of the invention defined in the appended claims.

Referring to the accompanying drawings which are for illustrative purposes only:

Fig. 1 is a longitudinal sectional view of a preferred embodiment of the invention;

Fig. 2 is an end view of the swivel connection;

Fig. 3 is a sectional view taken as indicated on the line 3—3 of Fig. 1;

As shown in Fig. 1 the swivel connection comprises an outer swivel part 10 having a cylindrical bell portion 11 from which a tubular portion 12 extends, this tubular portion 12 having therein a fluid passage 13 which is bent at right angles to the axis of the cylindrical bell portion 11. The swivel part 10 is of angle form, consisting of parts 11 and 12 arranged on axes disposed at right angles to each other.

The cylindrical portion 11 of the outer swivel parts 10 has an opening 14 to receive a cylindrical portion 15 of an inner swivel part 16. The inner swivel part 16 has a laterally bent tubular portion 17. The tubular portions 12 and 17 of the respective outer and inner swivel parts 10 and 16 are provided for connection with fluid conveying or containing members, such as pipes for example. The tubular portions 12 and 17 extend in parallel planes and are disposed at right angles to the axis of the cylindrical portions 11 and 15. For this purpose the tubular parts 12 and 17 are shown with threads 18.

At the leftward, or inner end of the opening 14, the swivel part 10 has a radial shoulder 19, defining the inner end of the opening 14. Between the outer and inner cylindrical portion 11 and 15 of the swivel parts 10 and 16 there are rows 20 and 21 of bearing balls 22, and between these two rows 20 and 21 of bearing balls the inner swivel part 16 has thereon a rib or ring 23 having side faces 24 for engaging the balls 22 of the rows 20 and 21.

For closing the outer or rightward end of the opening 14, and for holding the bearing means in proper adjustment, a ring 25 is connected to the cylindrical portion 11 of the outer swivel part 10. This ring 25 is shown threaded into the cylindrical portion 11 to enable ready inward and outward adjustment thereof so that the balls 22 of the inner row 20 will engage the radial shoulder 19 and the leftward face 24 of the ring 23, and so that the balls 22 of the row of balls 21 will engage the rightward face 24 of the ring 23 and the inner or leftward end of the adjustable ring 25.

The inner cylindrical portion 15 has a cylindrical extension 26 and the outer swivel part 10 has therein a channel 27 to carry sealing means 28 in a position to engage the outer surface of the cylindrical extension 26 to prevent leakage of fluid from the interior of the swivel connection into the space between the outer and inner parts 11 and 15 containing the bearing means. Also, the inner swivel parts 16 has therein an external channel 29 to receive a sealing ring 30 arranged to engage the inner cylindrical surface of the adjusting ring 25. The rings 25 and 30 can not be moved into position over the tubular portion 17, but can be moved into their operative positions over the cylindrical portion 15 when the ring 23 is removed.

The ring 23 is characterized by being split so that it may be assembled upon the inner cylindrical portion 15 after placement of the rings 25 and 30 in their operative positions on the cylindrical portion 15 surrounding the channel 29. To prevent expansion of the bearing ring 23, it is provided with a shoulder or cylindrical shelf 31 positioned so that it will be engaged by some of the balls 22 and thereby prevented from moving radially outwardly. As shown in Figs. 1 and 3, this shelf 31 is positioned so that it will lie radially inwardly of the balls 22 of the row 21, the outer face of the shelf being in engagement with the radially inwardly faced portions of the balls of the row 21 so that these balls roll upon the outer face of the shell 31 and limit or prevent outward movement of the component parts of the ring 23. As shown in Fig. 3, the ring 23 may be split so that it will be divided into complementary parts 23a and 23b. Accordingly, the cylindrical shelf 31 will be divided into complementary parts 31a and 31b.

I claim:

1. In a swivel connection: an outer swivel part having a cylindrical portion defining a cylindrical opening and a radial shoulder at the inner end of said cylindrical opening; an inner swivel part having a cylindrical portion adapted to extend into said opening of said outer part, said inner swivel part having an external annular channel intermediate its ends; two rows of bearing balls disposed in said opening between said cylindrical portions of said outer and inner swivel parts; a split ring on said inner swivel part positioned in said opening between said rows of balls, said split ring having a cylindrical shelf means thereon lying radially inwardly of and being engaged by the balls of one of said rows of balls whereby radially outward movement of said split ring is prevented, the balls of said other row of balls rolling directly upon the cylindrical portion of said inner swivel part and between the radial face of said split ring adjacent said shelf and said radial shoulder of said outer swivel part; and a holding ring secured to said outer swivel part and being arranged to close the outer end of said opening.

2. In a swivel connection: an outer swivel part having a cylindrical portion defining a cylindrical opening and a radial shoulder at the inner end of said cylindrical opening; an inner swivel part having a cylindrical portion adapted to extend into said opening of said outer part, said inner swivel part having an external annular channel intermediate its ends; two rows of bearing balls disposed in said opening between said cylindrical portions of said outer and inner swivel parts; a split ring on said inner swivel part positioned in said opening between said rows of balls, said split ring having spaced radial faces and comprising at least two complementary parts having complementary cylindrical shelves thereon positioned adjacent one of said radial faces and so as to be engaged by inner portions of the balls of one of said rows of balls whereby radially outward movement of said split ring is prevented, the balls of said other row of balls rolling directly upon the cylindrical portion of said inner swivel part adjacent the other of said radial faces of said split ring; and a holding ring secured to said outer swivel part and being arranged to close the outer end of said opening, said holding ring being movable into operative position on said cylindrical portion of said inner swivel part, from the inner open end thereof, prior to the assembly thereon of said split ring and said balls, said rows of balls and said split ring being confined between said radial shoulder and said holding ring.

References Cited in the file of this patent

UNITED STATES PATENTS

| 986,678 | Bordo | Mar. 14, 1911 |
| 1,774,986 | MacKenzie | Sept. 2, 1930 |
| 2,650,864 | Mergen | Sept. 1, 1953 |
| 2,655,391 | Atkins | Oct. 13, 1953 |
| 2,701,146 | Warren | Feb. 1, 1955 |